June 15, 1954 J. FRASER 2,681,073
VALVE FOR CONTROLLING THE FLOW OF LIQUIDS
Filed July 31, 1952 6 Sheets-Sheet 1

INVENTOR
JOHN FRASER
BY
ATTORNEY

June 15, 1954 J. FRASER 2,681,073
VALVE FOR CONTROLLING THE FLOW OF LIQUIDS
Filed July 31, 1952 6 Sheets-Sheet 4

INVENTOR
JOHN FRASER
BY
ATTORNEY

June 15, 1954  J. FRASER  2,681,073
VALVE FOR CONTROLLING THE FLOW OF LIQUIDS
Filed July 31, 1952  6 Sheets-Sheet 5

INVENTOR
JOHN FRASER
BY
ATTORNEY

Fig.8.

Patented June 15, 1954

2,681,073

UNITED STATES PATENT OFFICE 2,681,073

VALVE FOR CONTROLLING THE FLOW OF LIQUIDS

John Fraser, Tolworth, Surbiton, England, assignor to Avery-Hardoll Limited, Tolworth, Surbiton, England Application July 31, 1952, Serial No. 301,879

Claims priority, application Great Britain August 2, 1951

7 Claims. (Cl. 137—235)

This invention relates to valves for controlling the flow of liquids, and more particularly, to valves for controlling the filling of tanks and like receptacles so that the supply is cut off when a predetermined quantity of liquid is in the receptacle. A particular use of such valves is in connection with the filling of tank vehicles which carry petrol and like liquid fuels for delivery to petrol stations.

The valve to which the invention relates is of the kind in which the flow of liquid through the valve causes suction of air through a passage the inlet of which is closed when the liquid reaches a predetermined level in the receptacle, the closure of the said passage producing a depression the action of which, on a piston, diaphragm or equivalent movable member, results in the closing of the valve.

The abrupt closing of a valve in a liquid flow system in which liquid is flowing at a high speed produces violent "water hammer," and the rate at which receptacles can be filled through valves of the above kind is thus limited, since, in the known forms of valve, the rate of flow remains constant up to the actual closing of the valve.

Moreover, a valve providing a high rate of flow must provide a large flow area when open and must take an appreciable time to close, so that it is practically impossible to provide an accurate cut-off in one operation from a high speed full-flow condition.

The object of the present invention is to provide a valve of the kind referred to, which permits the use of such a high rate of flow during filling operations as would produce violent water hammer if the valve were closed abruptly whilst the liquid was flowing at that rate, and provides accurate control of the quantity of liquid fed into the receptacle.

According to the invention, in a filling valve of the kind referred to, the valve is arranged to close in two stages, the first stage of closing being effected shortly before the liquid in the receptacle being filled reaches the desired level, and reducing the rate of flow of liquid through the valve.

The piston, diaphragm or equivalent movable member preferably acts directly on the closure member of the valve, and two pipes of different lengths may extend downwardly into a receptacle to be filled, the dip tube which extends farthest into the receptacle being connected, when the valve is fully open, to a working space in which the depression acts to urge the valve towards the closed position, and detent means being provided which stop the closing movement of the valve in a position in which that dip tube is cut off from the working chamber and the other dip tube is connected thereto, the valve being then partially closed.

The invention is hereinafter described with reference to the accompanying drawings, in which.

Figures 1, 2:
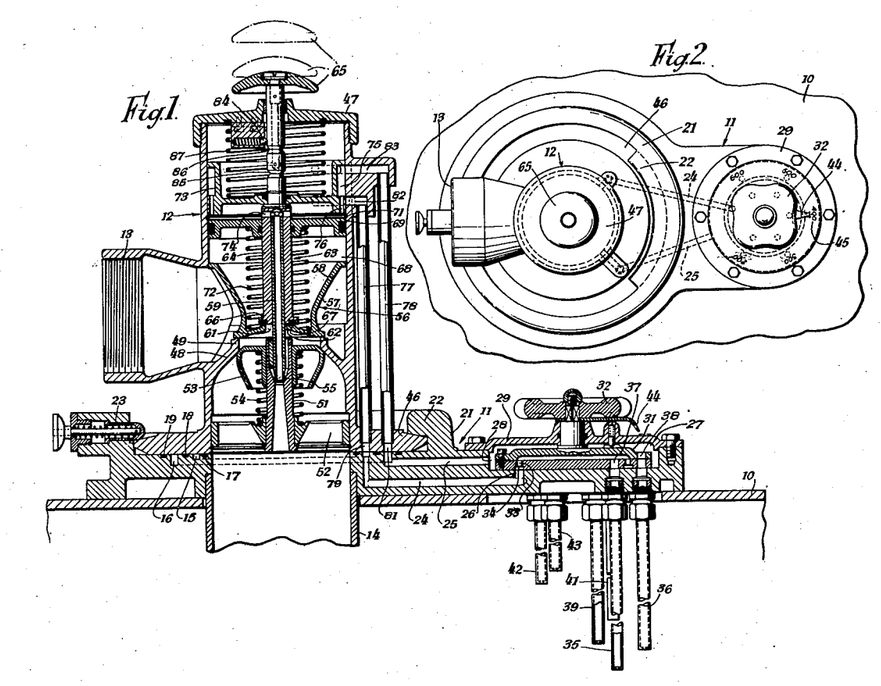
Figure 1 is a vertical section through one form of filling valve according to the invention.
Figure 2 is a plan view of the valve shown in Figure 1.

Referring to Figures 1 and 2, a part of the top wall of a tank of a tank vehicle is shown at 10, a receiving unit 11 being secured to the said wall in any suitable manner, for example by bolts (not shown). The receiving unit 11 includes means for detachably securing thereto a valve unit 12 having an inlet 13 to which a supply hose (not shown) is permanently connected. A pipe 14 leads downwardly from the receiving unit 11 to the bottom of the tank, and the upper face of the unit 11 is formed with two grooves 15 and 16 concentrically surrounding the upper end of the pipe 14, packing rings 17, 18 and 19 being housed in shallower grooves in the upper face of the unit 11, the packing ring 18 being between the two grooves 15 and 16, the packing ring 17 being between the pipe 14 and the groove 15, and the packing ring 19 being on the outer side of the groove 16. An upstanding rim 21 which surrounds the grooves and pipe has an inwardly directed flange 22 extending around a part of its circumference subtending an angle of about 90° at its centre, and an inwardly projecting spring loaded bolt 23 is provided diametrically opposite to the centre of the flange 22. Passages 24 and 25 leading respectively from the grooves 15 and 16 lead respectively to a port 26 in the base of a disc-shaped chamber 27 in the unit 11, and to a port 28 in the cylindrical wall of the said chamber. The chamber 27 is closed by a cover 29 and houses a hollow disc valve 31 which engages the base of the chamber and is rotatable by means of a knob 32 on a spindle projecting through the cover 29. The interior of the disc valve 31 is connected by ports 33 to an annular groove 34 in the underside of the valve, the groove being in register with the port 26, so that the interior of the disc valve is permanently in communication with the groove 15 whilst the chamber 27 is permanently in communication with the groove 16. A series of pairs of tubes such as those shown at 35 and 36 depend into the tank from the underside of the chamber 27, one tube of each pair, for example the tube 35, being somewhat longer than the other tube of the pair. Suitable ports 37 and 38 are provided in the disc valve 31 so that when the port 37 is in register with a tube such as 35, the port 38 is in register with the companion tube 36. The port 38 extends right through the disc valve 31, and thus connects the tube 36 to the interior of the chamber 27, whilst the port 37 leads into the interior of the hollow disc valve 31.

Other pairs of tubes similar to the tubes 35, 36 but of different lengths, are shown at 39, 41 and 42, 43, and it will be understood that by turning the disc valve 31 to a suitable position, the shorter tube of any pair can be connected to the groove 16, whilst the longer tube of that pair is connected to the groove 15. The tubes are all open at their lower ends.

The shorter tube of each pair depends into the tank to such a distance that its lower end is just submerged when a predetermined quantity of liquid is in the tank, the predetermined quantity being different for each tube. For example, tubes may be provided which are submerged when the tank contains 200, 300, 400, 500 and 600 gallons respectively. The knob 32 carries a pointer 44 which co-operates with figures 45 on the cover 29 to indicate which pair of tubes is connected to the grooves 15 and 16.

The valve unit 12 is tubular, and has a flange 46 at its lower end, the edge of the flange being chamfered on both faces as shown. The valve unit is secured to the receiving unit by fitting the edge of the flange 46 at one side underneath the flange 22, and pressing down the other side of the flange 46 into the recess surrounded by the rim 21, until the lower face of the flange 46 rests on the packing rings 17, 18, and 19, and the bolt 23 can move inwardly over the upper surface of the flange 46 and serve as a latch to hold it in place. The upper end of the valve unit 12 is closed by a cover 47.

A frusto-conical wall 48 inside the valve unit 12 supports a valve seat ring 49 defining an orifice lying between the inlet 13 and the open lower end of the valve unit, and a stem 51 supported by a spider 52 secured in the lower end of the unit 12 forms a guide for a non-return valve closure member 53 urged against the underside of the seat ring by a spring 54. The stem 51 is tubular, the passage through it being in the form of a venturi 55.

A cut-off valve closure member 56 seats on the upper side of the seat ring 49, this valve member 56 having an outwardly flared skirt 57 the edge of which engages the wall of the valve unit above the inlet 13. A small port 58 is formed in the skirt 57. A tube 59 leading into the throat of the venturi 55, and fixed to the stem 51, passes through a hole 61 in the centre of the cut-off valve closure member 56 the hole 61 being large enough to provide a substantial clearance around the tube 59 but having projecting across it radial fingers 62 which provide a guide for the said member 56 on the tube. A stem 63, having a tubular portion 64 which is slidable on the tube 59, extends through the cover 47, having on its exposed end a knob 65 by which it can be gripped for axial movement. The lower end of the stem 63 is flanged, and carries in an annular groove in its end face a seat ring 66 adapted to engage a rib 67 surrounding the hole 61 to close the said hole. The space 68 above the valve member 56 is bounded at its upper end by a disc 69 through which the stem 63 passes, packing rings being provided to render fluid tight the joints between the disc 69 and the stem 63 and between the disc 69 and the body of the valve unit respectively, the disc 69 being located against upward movement by a spring ring 71 fitted in a groove in the wall of the valve unit body, and being urged upwardly towards the spring ring 71 by a spring 72 serving also as a closing spring for the valve member 56. A piston 73 is secured to the stem 63 between the disc 69 and the cover 47. Ports 74 in the stem, leading radially into its tubular portion 64, connect the tube 59 to the space below the piston 73. The peripheral surface of the piston is formed with a circumferential groove 75 connected by passages 76 to the underside of the piston. Two tubes 77 and 78 which extend alongside the body of the valve unit 12 connect ports 79 and 81 in the flange 46, which ports register respectively with the grooves 15 and 16, with longitudinally spaced radial ports 82 and 83 in the wall of the valve unit body. The tubes 77 and 78 are shown in the same plane in Figure 1, for convenience of illustration but in practice would occupy the positions shown in Figure 2.

A spring-loaded ball detent 84 co-operates with two grooves 85 and 86 in the stem 63 to hold the latter respectively in an upper position and in an intermediate position, its lower position being determined by the engagement of the valve member 56 with the seat ring 49 and the engagement of the seat ring 66 with the rib 67. When the stem 63 is in the upper position, the port 82, which is connected to the groove 15, and therefore to the longer tube of a pair such as the tubes 35, 36, is below the piston 73, and is thus open to the space below the piston, whilst the port 83, which is connected by way of the groove 16 to the other tube of the pair, is covered by the part of the peripheral wall of the piston below the groove 75. When the stem is in the intermediate position, the port 82 is covered by the piston, and the port 83 is in register with the groove 75, so that it is connected to the space below the piston. The piston 73 is urged downwardly by a spring 87.

The valve illustrated in Figures 1 and 2 operates in the following manner. The valve unit 12 is first of all secured in position on the receiving unit 11, the disc valve 31 having been set to connect the annular grooves 15 and 16 to the pair of dip tubes corresponding to the quantity of liquid which it is desired to have in the tank. The stem 63 is then lifted by means of the knob 65 until the detent 84 enters the groove 85, thus lifting the seat ring 66 away from the rib 67 to expose the hole 61; opening the port 82 and closing the port 83. The pressure of incoming liquid acts on the skirt 57 of the cut-off valve 56, and lifts that valve away from the seat ring 49. The liquid then opens the non-return valve 53 and flows through the pipe 14 into the tank, the loading spring 54 of the non-return valve 53 causing a pressure drop across that valve which is substantially constant regardless of the rate of flow of the liquid. Thus the flow through the venturi, which is in parallel with the flow through the non-return valve, is substantially constant, and induces a flow of air through the longer dip tube of the pair in use, the tube 77, port 82, ports 74 and tube 59. So long as the lower end of the longer dip tube is not submerged, this flow is not affected, but when the liquid in the tank rises far enough to cover the lower end of that tube the flow of air is stopped, and a sudden suction is applied to the piston 73, tending to urge it downwardly. The suction releases the ball detent 84, and the piston moves down until it reaches the intermediate position where the detent enters the groove 86, the movement of the piston opening the port 83 to the groove 75 before the piston reaches the intermediate position, and thus destroying the suction, so that the force acting on the piston disappears, and there is no tendency to overshoot the intermediate position. The port 83 is opened some time before the piston reaches the intermediate position, so that during a substantial part of its movement only the force of the spring 72 is acting on the piston, and its movement is damped by the restriction of flow of liquid through the port 58. The valve therefore moves gradually. In the intermediate position, the stem 63 restricts the opening of the cut-off valve closure member 56, and so reduces the rate of flow of the liquid through the valve. Flow continues at the reduced rate until the liquid level in the tank reaches the lower end of the shorter dip tube, when the flow of air into the space below the piston 73 through the port 83 is cut off, and suction is thus again applied to the piston to release the detent 84 and move the piston 73 and stem 63 to their lowermost position, in which the stem 63 urges the cut-off valve closure member 56 on to the seat ring 49, thus closing the valve. Liquid enters the space 69 above the valve closure member 56 through the port 58, and, as the hole 61 is closed to prevent its escape, the pressure in the space 68 builds up to the same value as that surrounding the skirt 57, and helps to keep the valve closed. By the time the liquid level has reached the shorter dip tube, any turbulence due to the rapid flow of liquid before the first stage of closing of the valve has been smoothed out, and the liquid presents a level surface, thus ensuring an accurate cut-off.

Figure 8:
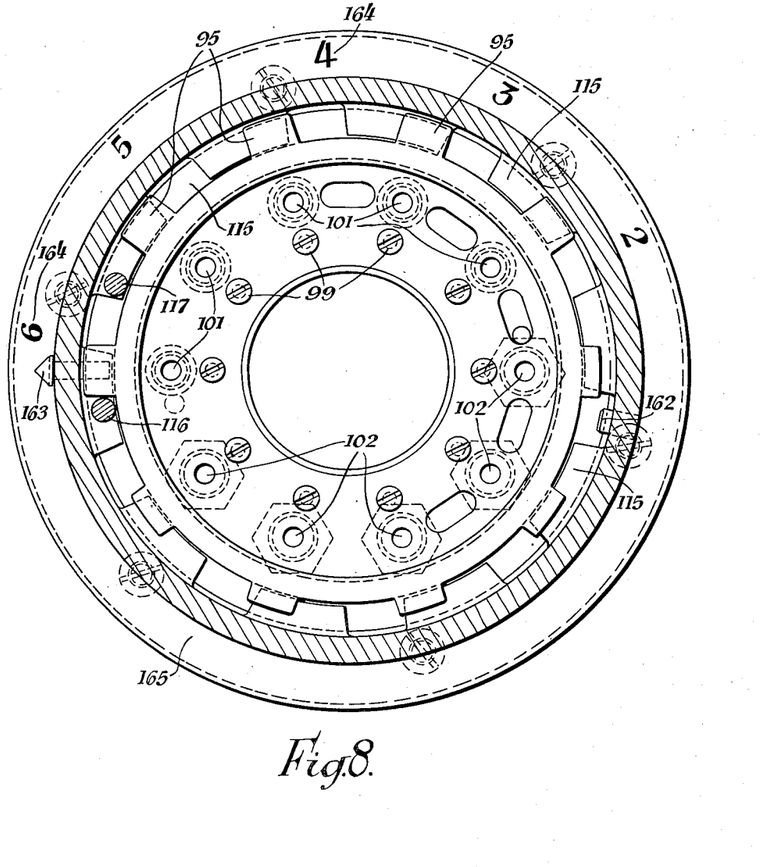
Figure 8 is a sectional plan on the line 8—8 of Figure 3.
Figure 9:
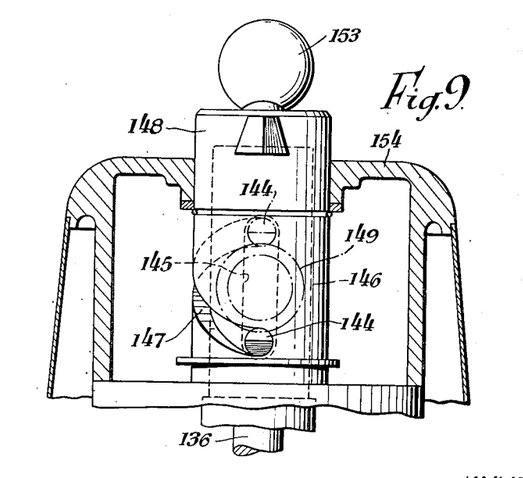
Figure 9 is a detail view looking from the left-hand side of Figure 3.

In the arrangement shown in Figures 3 to 9 of the drawings, a part of the top wall of a fuel tank of a tank vehicle is shown at 91, and a receiving unit 92, secured to the tank by bolts 93, provides means for attaching to the said tank a valve unit 94. The receiving unit 92 comprises a cylindrical portion projecting upwardly from a flange through which the bolts 93 pass, the cylindrical portion being provided with a plurality of equally spaced radial lugs 95. The upper face of the receiving unit is recessed to receive a packing washer 96 constituted by a metal washer 97 embedded in rubber-like material, the washer 96, surrounding a central opening leading into a tube 98 extending nearly to the bottom of the tank. The packing washer 96 is secured in position by screws 99. Two arcuate series of holes are formed in the washer 96, as shown in Figure 8, each of the holes 101 in one series being diametrically opposite to one of the holes, 102, in the other series, and each hole 101 or 102 leads, by way of an aligned hole in the receiving unit, into a dip tube 103 or 104 (Figure 4), the dip tubes 103 being of different lengths so that the lower end of one of them is just submerged when there is one selected quantity of liquid, for example 200 gallons, in the tank, the lower end of another is just submerged when there is another selected quantity, for example 300 gallons, in the tank, and so on. Each dip tube 104 is rather longer than the tube 103 diametrically opposite to it, a suitable difference being about one inch.

Figure 3:
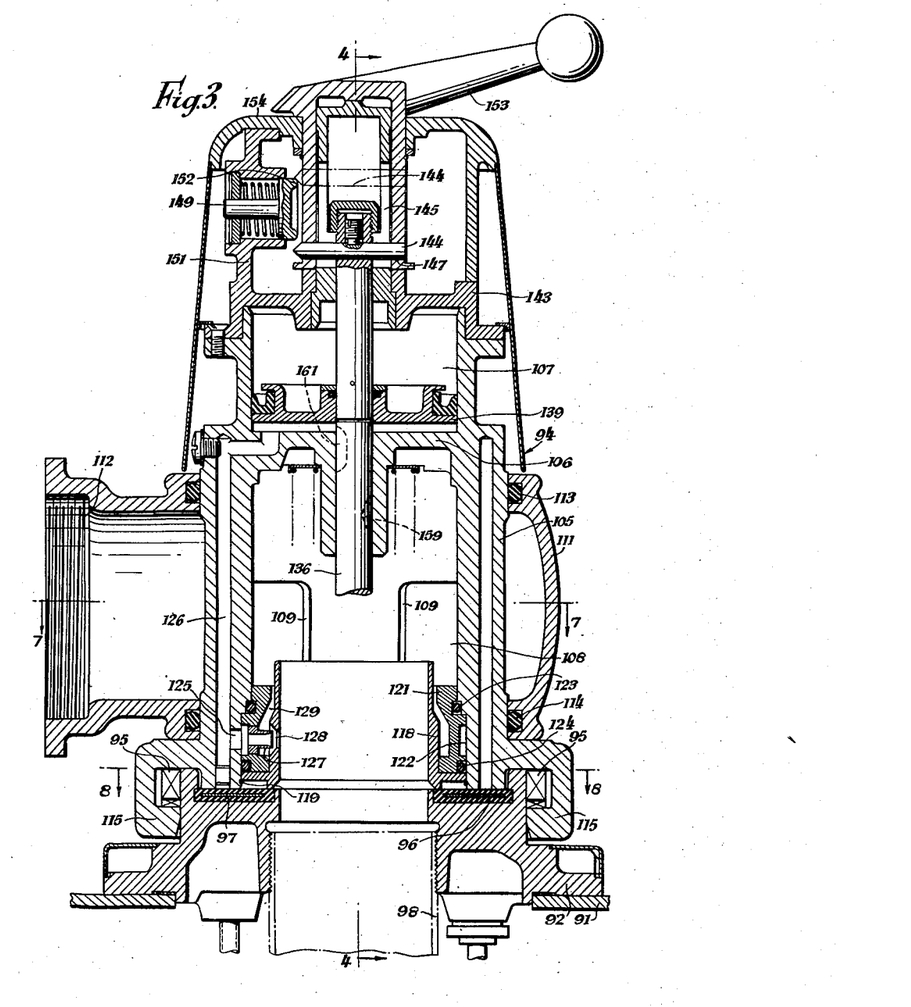
Figure 3 is a vertical section through another form of filling valve according to the invention, the valve closure member being omitted.

The valve unit 94 comprises a tubular body 105 divided by a partition 106 into upper and lower chambers 107 and 108, the lower chamber 108 having large ports 109 formed in its peripheral wall. The ports 109 open into a sleeve 111 rotatably mounted on the body and having an inlet connection at 112 for the attachment of a supply hose (not shown). Packing rings 113 and 114 prevent leakage of liquid between the sleeve and the body. The valve unit has a recess at its lower end into which fits the cylindrical portion of the receiving unit, a plurality of inwardly projecting radial lugs 115 being provided around the rim of the recess to co-operate with the lugs 95 on the receiving unit, the lugs 115 being adapted to pass between the lugs 95 when the valve unit is fitted to the receiving unit, and to pass under the said lugs 95 when the valve unit is subsequently rotated. Stops 116 and 117 on the valve unit 94 limit the degree of relative rotation of the two units. The lower end surface of the tubular body 105 rests on the packing washer 96, as does also the lower end of a flanged tube 118 retained in the body by a spring ring 119. A ring 121 located between the tube 118 and the body 105 has an external circumferential groove 122 between two fluid-tight packing rings 123 and 124, a port 125 in the body 105 connecting this groove 122 to a longitudinal passage 126 which leads into the chamber 107. Opposite to the port 125 is a nozzle 127 concentric with a port 128 in the wall of the tube 118, the port, which has inwardly convergent walls, connecting an annular space 129 between the tube 118 and the ring 121 with the interior of the tube 118.

A valve closure member 131 (Figures 4 to 6) is slidable in the chamber 108, the said member carrying in a groove formed in its lower face a seating ring 132 which, when the valve is closed, engages the upper end surface of the ring 121, the closure member 131 being formed with an annular groove 133 to receive the upper end of the tube 118 when the valve is closed. The valve closure member has a circumferential recess 134 and the radius of the seating ring 132 is smaller than that of the chamber 108, so that if pressure in the recess 134 is greater than that in the chamber 108 above the closure member, the closure member tends to rise and so open the valve. The valve closure member 131 is cup shaped, having a hole 135 in the centre of its base, and a stem 136 slidable in the partition 106 carries a head 137 supporting a seating ring 138 adapted to engage a rim around the hole 135 to close the said hole. The stem 136 carries a piston 139 slidable in the chamber 107. A small opening 140 is formed in the valve closure member 131. A spring 141 acts to urge the valve closure member 131 downwardly, and a second spring 142 acts to urge the head 137 and piston 139 downwardly.

The chamber 107 is closed at its upper end by a cover 143 through which the stem 136 projects, the stem carrying a cross-pin 144 (Figure 3) slidable in longitudinal slots 145 in the walls of a tubular member 146 fixed in the cover 143, and also in helical slots 147 (Figure 9) in the walls of a sleeve 148 rotatable on the tubular member 146, but restrained against axial movement with respect thereto. One end of the pin 144 co-operates with a detent member 149 slidable in a lateral opening in a bracket 151 integral with the cover 143, the detent member, which is spring-urged inwardly, comprising a plunger having a rib 152 around its inner end face. As the pin 144 lies in a plane including a diameter of the detent plunger 149, the latter locates the stem in two positions. The sleeve 148 carries a handle 153 by which it can be rotated manually. A cap 154 covers the pin 144 and the detent mechanism.

Two longitudinal passages 155 and 156 (Figures 4 to 6) are formed in the wall of the body 105, one diametrically opposite to the other, the positions of the passages being so arranged that when the lugs 95 and 115 are interengaged, the passage 155 is aligned with a port 101 and the passage 156 is aligned with a port 102. The passages 155 and 156 lead respectively into radial passages 157 and 158 in the partition 106, both of which open into the aperture in the passage through which the stem 136 passes. Two grooves are cut in the stem 136, on opposite sides thereof and in spaced relation longitudinally, one groove 159 being so positioned that when the stem 136 is lifted to its uppermost position it connects the passage 158 to the part of the chamber 107 below the piston 139, whilst when the stem 136 is in an intermediate position the other groove 161 connects the passage 157 to that part of the chamber 107, each of the passages 157 and 158 being closed by the stem 136 when the other passage is connected to the chamber 107.

In order that the passage 155 may be aligned with any one of the ports 101, of which there are five, and the passage 156 may be simultaneously aligned with one of the ports 102, the number of lugs 95 on the receiving unit 92 is ten, there being the same number of lugs 115 on the valve unit 94. Five of the lugs 95 are shortened, as shown in Figure 8, and a projection 162 is provided between two adjacent lugs 115 on the valve unit, so that only one of the shortened lugs 95 will pass between those two lugs 115. The valve unit can thus be mounted on the receiving unit in any one of five different positions, and a pointer 163 carried by the valve unit co-operates with markings 164 on a flanged disc 165 secured to the receiving unit to indicate the quantity of liquid in the tank which will close the shorter dip tube 103 which is operative when the pointer 163 is in register with that marking.

Figure 4:
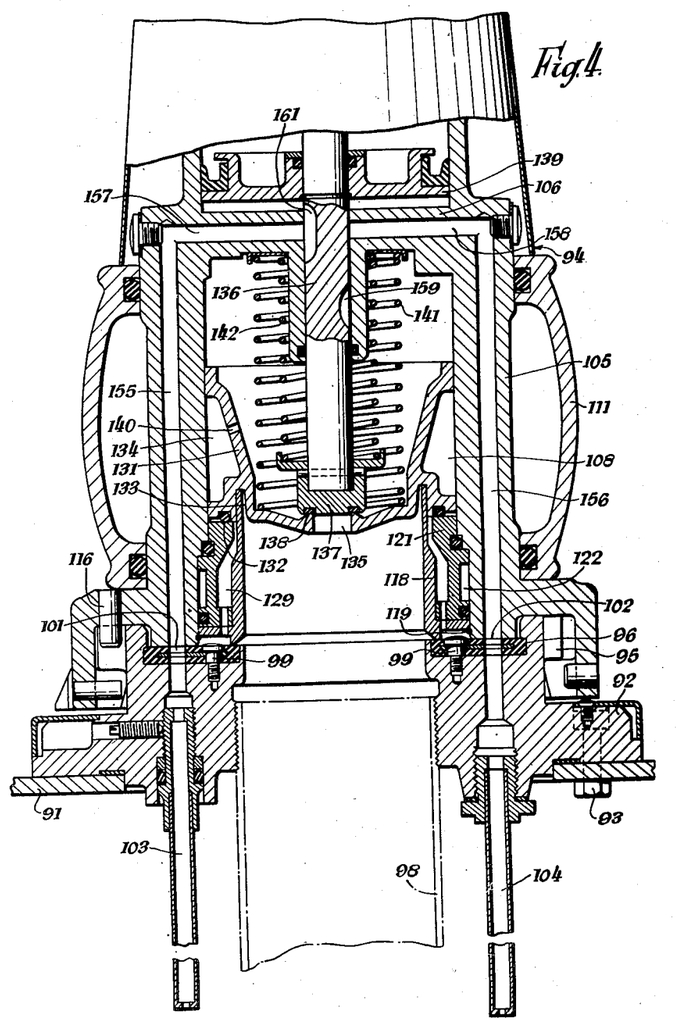
Figure 4 is a section on the line 4—4 of Figure 3 showing the valve in the closed position.
Figure 5:
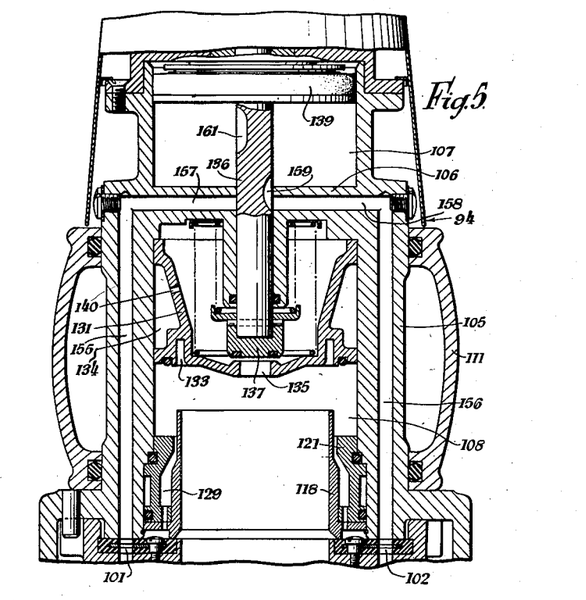
Figure 5 is a view similar to Figure 4 showing the valve fully open.
Figure 6:
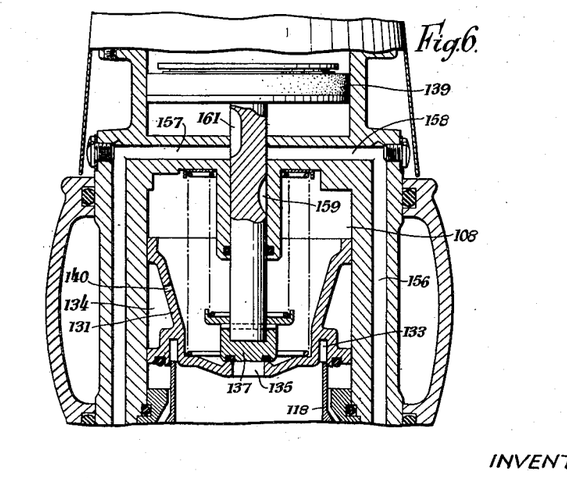
Figure 6 is a view similar to Figure 4 showing the valve partly closed.
Figure 7:
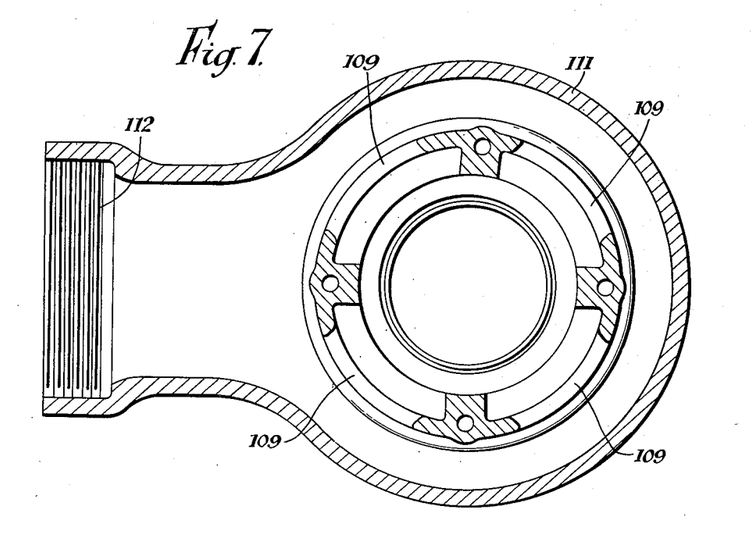
Figure 7 is a sectional plan on the line 7—7 of Figure 3.

The operation of the valve shown in Figures 3 to 9 is as follows. The valve unit 94 is secured to the receiving unit 92 in the appropriate position for the quantity of liquid which is to be put into the tank, and the stem 136 is lifted, by turning the handle 153, to the position shown in Figure 5, thus lifting the head 137 away from the hole 135 and connecting the longer dip tube 104, by way of the passages 156 and 158, and the groove 159, to the space below the piston 139 in the chamber 107. The pressure of incoming liquid lifts the valve closure member 131, and the liquid flows into the tube 98 both by way of the tube 118 and through the annular space 129 and the port 128. The liquid flowing through the latter path produces suction at the nozzle 127, which draws air from the chamber 107 below the piston 139, through the passage 126. When the liquid in the tank reaches a level such that the lower end of the dip tube 104 is immersed, air can no longer enter the chamber 107 from the tank to replace the air drawn out by the suction at the nozzle 127, and the piston is therefore pulled downwardly until the pin 144 engages the rib 152 at the lower side of the detent plunger 149, and the valve closure member 131 is moved towards its closed position leaving only a relatively restricted passage for the liquid between it and the upper edge of the flanged tube 118. Before the pin 144 reaches the position in which it engages the rib 152 at the lower side of the detent plunger 152, the groove 159 has moved far enough to disconnect the passages 156, 158 from the chamber 107, and the groove 161 has connected the passages 155, 157, and through them the dip tube 103, to the said chamber, so that air is again free to enter the said chamber from the tank, and the downward pull on the piston has ceased. Thus, the latter part of the piston movement, as in the arrangement previously described, takes place only under the load of the valve closing springs and is damped by the restriction of liquid flow through the port 140. This position of the parts is shown in Figure 6. The liquid continues to flow into the tank, at a slower rate owing to the partial closure of the valve, but, as the restriction takes place between the lower end of the valve closure member 131 and the upper end of the flanged tube 118 the port 128 is fed from the upstream side of the restriction, and the flow through the said port remains substantially constant. Filling of the tank therefore continues, at a slower rate, until the liquid rises sufficiently to cover the lower end of the shorter dip tube 103, when the suction at the nozzle 127 pulls the piston 139 down to its lowest position and the valve closure member 131 moves down to bring the seating ring 132 into engagement with the upper end of the ring 121, thus finally closing both the flanged tube 118, and the entrance to the annular space 129, as shown in Figure 4. Since the hole 135 is closed by the head 137, liquid can no longer escape from the space above the valve closure member 131, and liquid entering this space through the opening 140 causes the pressure therein to build up and assist in keeping the valve closed.

It will be understood that a valve according to the invention may be provided with only one pair of dip tubes if only one filling level is required, no disc valve or means for selectively positioning the valve unit then being required.

Where the selection of the filling level is made by a valve, as in the arrangement shown in Figures 1 and 2, and not by the selective positioning of the valve unit, the valve unit can be made for permanent fixing to a tank or other receptacle, a filling hose being connected thereto when filling is to take place, by any suitable form of hose coupling.

The valve need not be fixed to the top of the tank but may be located at the bottom or side thereof, the dip tubes being suitably arranged.

Where a filling valve is for use with tanks or receptacles of uniform shape and size, or where it is desired only to ensure that the inflow of liquid ceases before the receptacle is full, the dip tubes may be mounted on a valve unit, which is itself permanently attached to the filling hose and is fitted to each tank or receptacle only when the latter is to be filled.

In both the arrangements described, the suction acts on a piston which is coupled to the valve closure member. It will be understood that a diaphragm or other movable member may be substituted for the piston.

I claim:

1. Apparatus for controlling the filling of a receptacle with liquid comprising a valve device opened by liquid flowing into the receptacle, means to locate said valve device in a partially closed position, means responsive to flow of liquid through said valve device to induce a flow of air from said receptacle, means to temporarily obstruct said air flow responsive to the rise of liquid to a lower predetermined level in said receptacle, means to permanently obstruct said air flow responsive to the rise of liquid to a higher predetermined level in said receptacle, a chamber connected to said air flow inducing means between said air flow inducing means and the receptacle, and valve closing means responsive to the suction produced in said chamber when the air flow is obstructed, said valve device being closed to the position determined by said locating means when the liquid reaches the lower predetermined level in the receptacle, and being closed completely when the liquid reaches the higher predetermined level in the receptacle.

2. Apparatus for controlling the filling of a receptacle with liquid comprising a valve device opened by liquid flowing into the receptacle, detent means to locate said valve device in a fully open and in a partially closed position, means responsive to flow of liquid through said valve device to induce a flow of air from said receptacle, means to temporarily obstruct said air flow responsive to the rise of liquid to a lower predetermined level in said receptacle, means to permanently obstruct said air flow responsive to the rise of liquid to a higher predetermined level in said receptacle, a chamber connected to said air flow inducing means, and valve closing means responsive to the suction produced in said chamber when the air flow is obstructed, said valve device being moved from the fully open to the partially closed position when the liquid reaches the lower predetermined level in the receptacle, and being closed completely when the liquid reaches the higher predetermined level in the receptacle.

3. Apparatus for controlling the filling of a receptacle with liquid comprising a valve device opened by liquid flowing into said receptacle, means to locate said valve device in a partially closed position, means defining a chamber, means responsive to flow of liquid through said valve device to induce a flow of air from and create a suction in said chamber, tube means connecting said chamber to said receptacle and providing first and second air supply passages to said chamber openings into the receptacle respectively at lower and higher levels, means to connect said air supply passages alternatively to said chamber, means for operating said connecting means to connect said first air supply passage to said chamber, and means responsive to suction in said chamber to urge the valve device towards its closed position and to move said connecting means to connect said second air supply passage to said chamber, whereby the valve device is moved to the partially closed position when liquid reaches the lower level in the receptacle, and is closed completely when the liquid reaches the higher level in the receptacle.

4. Apparatus for controlling the filling of a receptacle with liquid comprising a valve body, a receiving unit on said receptacle defining an inlet orifice thereto, means for securing said valve body detachably to said receiving unit, a valve device in said valve body opened by liquid flowing into the receptacle through said valve body, means to locate said valve device in a partially closed position, a chamber in said valve body, means responsive to flow of liquid through said valve device to induce a flow of air from and create a suction in said chamber, passage means leading to said chamber and providing first and second air supply passages thereto, means to connect said air supply passages alternatively to said chamber, manual means for operating said connecting means to connect said first air supply passage to said chamber, means responsive to suction in said chamber to urge the valve device towards its closed position and to move said connecting means to connect said second air supply passage to said chamber, a plurality of pairs of tubes carried by said receiving unit and each comprising a tube opening into the receptacle at a lower level and a tube opening into the receptacle at a higher level, and means to connect the tubes of any of said pairs respectively to the first and second air supply passages, whereby the valve device is moved first to the partially closed position and subsequently to the fully closed position by the rise of liquid level in the receptacle and the consequent closing by the said liquid of the openings of the tubes connected to the air supply passages.

5. Apparatus as defined in claim 4, and valve means on said receiving unit to selectively connect said pairs of tubes to said air supply passages.

6. Apparatus as defined in claim 4, wherein the valve body is provided with engaging means and the receiving unit is provided with co-operating engaging means, said engaging means on said valve body and receiving unit being arranged to interengage with one another in any one of a plurality of positions in each of which the supply passages are connected to one pair of tubes on said receiving unit.

7. Apparatus for controlling the filling of a receptacle with liquid comprising a valve device including a seat and a valve closure member engaging said seat to close the valve device, said valve closure member having an area exposed to liquid pressure on the upstream side of the valve seat on which liquid pressure acts to open the valve, a space in said valve device partially enclosed by said valve closure member and in which liquid pressure acts to close the valve, the area of the valve closure member exposed to said space being greater than the area of said valve closure member exposed to liquid pressure upstream of said valve seat, a restricted orifice connecting said space to the upstream side of said valve seat, a larger orifice in said valve closure member connecting said space to the downstream side of said valve seat, a slidable stem constituting a stop limiting the movement of said valve closure member away from its seat, means on said stem to control the flow of liquid through said larger orifice, means responsive to flow of liquid through said valve device to induce a flow of air from said receptacle, means to temporarily obstruct said air flow responsive to the rise of liquid to a lower predetermined level in said receptacle, means to permanently obstruct said air flow responsive to the rise of liquid to a higher predetermined level in said receptacle, a chamber connected to said air flow inducing means, means responsive to the suction produced in said chamber when the air flow is obstructed to move said stem to reduce the opening of the valve, and means to locate said stem in a position to maintain the valve closure member in a partially closed position after its movement due to the temporary obstruction of the air flow.

References Cited in the file of this patent

UNITED STATES PATENTS

| Number | Name | Date |
|---|---|---|
| 960,872 | Fischer | June 7, 1910 |
| 2,013,188 | Reinhardt | Sept. 3, 1935 |
| 2,308,347 | Asselin | Jan. 12, 1943 |
| 2,402,036 | Giger | June 11, 1946 |